United States Patent Office 3,133,070
Patented May 12, 1964

3,133,070
BIS-MALEAMIDES PREPARED FROM PIPERAZINES AND N-SUBSTITUTED ISOMALEIMIDES
Carol K. Sauers, Middlebush, and Robert J. Cotter, New Brunswick, N.J., assignors to Union Carbide Corporation, a corporation of New York
No Drawing. Filed Oct. 10, 1961, Ser. No. 144,045
7 Claims. (Cl. 260—268)

This invention relates to bis-maleamides.

This bis-maleamides of the present invention are of the formula:

(FORMULA I)

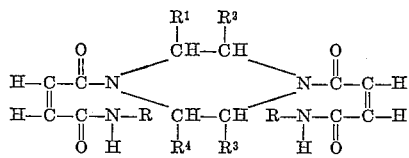

wherein each R is a monovalent hydrocarbon radical, as will be defined subsequently, and $R^1$, $R^2$, $R^3$ and $R^4$, which can be the same or different, are hydrogen or monovalent hydrocarbon radicals and when monovalent hydrocarbon radicals containing, in general, from 1 to 12 carbon atoms inclusive and preferably containing from 1 to 8 carbon atoms inclusive. Illustrative of suitable monoavlent hydrocarbon radicals for $R^1$, $R^2$, $R^3$ and $R^4$ are the alkyl radicals such as methyl, ethyl, isopropyl, n-butyl and the like, and aryl radicals such as phenyl, tolyl, ethylphenyl and the like. Particularly desirable bis-maleamides for purposes of this invention are those wherein $R^1$, $R^2$, $R^3$ and $R^4$ are as defined and each R is an aryl radical or an alkyl radical containing from 1 to 20 carbon atoms inclusive.

The bis-maleamides of this invention, in addition to having utility as monomers which can be polymerized with an α-pyrone to produce thermoplastic polymers, exhibit anthelmintic action in chickens. Furthermore, these bis-maleamides can be used as nematocides. As an illustration of the use of the bis-maleamides as monomers which are polymerized with an α-pyrone, the bis-maleamide of Example 1 can be polymerized with 4,6-dimethyl-5-carbethoxy-α-pyrone by heating equimolar amounts of the two at reflux, in a flask containing bromobenzene, for about 72 hours. The polymer so produced can be cast into film which can be used for wrapping toys and other such articles.

In the preparation of the bis-maleamides, a piperazine of the formula:

(FORMULA II)

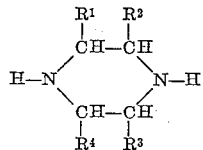

wherein $R^1$, $R^2$, $R^3$ and $R^4$ are as previously defined, is reacted with an N-substituted isomaleimide of the formula:

(FORMULA III)

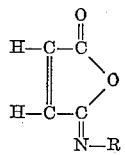

wherein R, as previously defined, is a monovalent hydrocarbon radical.

The term "monovalent hydrocarbon radical" as used herein with respect to each R refers to substituted monovalent hydrocarbon radicals as well as to unsubstituted monovalent hydrocarbon radicals.

Exemplary of such radicals are the following: alkyl radicals, such as methyl, ethyl, n-propyl, n-butyl, n-hexyl, 2-ethyl-n-hexyl, n-octyl, n-dodecyl, and the like; cycloalkyl radicals, such as cyclohexyl and the like; unsaturated alkyl and cycloalkyl radicals, such as allyl, cyclopentenyl, and the like; halogenated alkyl and cycloalkyl radicals, such as chloroethyl, bromoethyl, fluoroethyl, 2-chloro-n-propyl, 2-bromo-n-propyl, 2-chloro-n-butyl, 3-chloro-n-amyl, 3-bromo-n-amyl, 2-chloro-n-hexyl, 2-chlorocyclohexyl, and the like; alkoxy and aryloxy substituted alkyl and cycloalkyl radicals, such as methoxymethyl, ethoxyethyl, 3-ethoxy-n-propyl, 4-ethoxy-n-butyl, 3-ethoxy-2-ethyl-n-hexyl, 2-methoxycyclohexyl, phenoxymethyl, 2-phenoxyethyl, 3-phenoxy-n-propyl, 2-phenoxycyclohexyl, and the like; aralkyl radicals, such as benzyl, 2-phenylethyl, 3-phenyl-n-propyl, 1-phenyl-n-butyl, 1-phenyl-n-eicosyl, and the like; aryl radicals, such as phenyl, naphthyl, and the like; halogenated aryl radicals, such as p-chlorophenyl, p-bromophenyl, p-fluorophenyl, p-iodophenyl, 2-chloronaphthyl, 2-bromonaphthyl, and the like; alkoxy and aryloxy substituted aryl radicals, such as p-methoxyphenyl, p-ethoxyphenyl, p-n-propoxyphenyl, and the like; alkaryl radicals, such as o-methylphenyl, p-ethylphenyl, p-n-propylphenyl, o-n-propylphenyl, o-n-butylphenyl, p-n-dodecylphenyl, p-(2-ethyl-n-hexyl)phenyl, and the like; nitro substituted aryl radicals, such as p-nitrophenyl, 2-nitronaphthyl, and the like; other suitable radicals include 4-hydroxy-1-naphthyl, and the like.

Representative of isomaleimides wherein R in Formula III previously given is a monovalent hydrocarbon radical are the following: N-methyl isomaleimide, N-ethyl isomaleimide, N-n-propyl isomaleimide, N-allyl isomaleimide, N-n-butyl isomaleimide, N-tertiary butyl isomaleimide, N-n-hexyl isomaleimide, N-(2-ethyl-n-hexyl) isomaleimide, N-n-heptyl isomaleimide, N-n-nonyl isomaleimide, N-n-dodecyl isomaleimide, N-n-eicosyl isomaleimide, N-cyclohexyl isomaleimide, N-(2-chloroethyl)isomaleimide, N-(2-bromoethyl)isomaleimide, N-(2-fluoroethyl)isomaleimide, N-(2-iodo-n-propyl)isomaleimide, N-(2-chloro-n-hexyl)isomaleimide, N-methoxymethyl isomaleimide, N-benzyl isomaleimide, N-(2-phenylethyl)isomaleimide, N-(3-phenyl-n-propyl)isomaleimide, N-(4-phenyl-n-butyl)isomaleimide, N-phenyl isomaleimide, N-naphthyl isomaleimide, N-(o-chlorophenyl)isomaleimide, N-(m-bromophenyl)isomaleimide, N-(p-fluorophenyl)isomaleimide, N-(o-iodophenyl)isomaleimide, N-(o-methoxyphenyl)isomaleimide, N-(m-methoxyphenyl)isomaleimide, N-(p-ethoxyphenyl)isomaleimide, N-(p-n-butoxyphenyl)isomaleimide, N-(p-chloro-m-methylphenyl)isomaleimide, N-(o-methylphenyl)isomaleimide, N-(m-methylphenyl)isomaleimide, N-(o-ethylphenyl)isomaleimide, N-(m-ethylphenyl)isomaleimide, N-(p-ethylphenyl)isomaleimide, N-(o-isopropylphenyl)isomaleimide, N-(m-isopropylphenyl)isomaleimide, N-(p-isopropylphenyl)isomaleimide, N-(o-n-butylphenyl)isomaleimide, N-(m-n-butylphenyl)isomaleimide, N-(4-hydroxy-2-naphthyl)isomaleimide, N-(4-hydroxy-1-naphthyl)isomaleimide, and the like.

N-substituted isomaleimides which are reacted with a piperazine to produce the bis-maleamides are conveniently prepared by reacting an N-substituted maleamic acid of the formula:

Formula IV

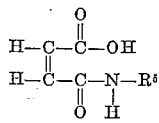

wherein $R^5$ is a monovalent hydrocarbon radical as defined for R, with a carbodiimide of the formula:

Formula V $$R^6—N=C=N—R^7$$

wherein $R^6$ and $R^7$ are hydrocarbon radicals. Preparation of N-substituted isomaleimides is described in detail in our copending application, Serial No. 851,029, filed November 5, 1959, now U.S. Patent 3,035,065, issued May 15, 1962, which is incorporated herein by reference.

When reacting a piperazine with an N-substituted isomaleimide, at least two moles of the N-substituted isomaleimide are used per mole of the piperazine.

The temperature at which the reaction between the N-substituted isomaleimide and the piperazine is conducted can also vary over a wide range, from as low as about 0° C. to a temperature just below the decomposition point of the starting materials and of the bis-maleamide which is to be formed. At temperatures lower than about 0° C. the reaction proceeds sluggishly. A temperature in the range of about 20° C. to about 100° C. is most preferred.

It is also preferred to conduct the reaction between the piperazine and the N-substituted isomaleimide in the presence of an organic diluent which is a solvent for the starting materials and is non-reactive with respect to the starting materials and the final product. The use of an organic diluent facilitates removal of the bis-maleamide from the reaction mixture. The actual organic diluent used will depend upon the starting materials and the temperature at which the reaction is to be conducted. The organic diluent should have a boiling point equal to or above the reaction temperature. It is customary to use the organic diluent in amounts of at least about 50% by weight based on the weight of the starting materials. The upper limit with respect to the amount of organic diluent used will depend upon the rate at which it is desired to conduct the reaction. The more dilute the reaction mixture, the slower the rate of reaction. From a practical standpoint, the organic diluent is used in amounts up to 500% by weight based on the weight of the starting materials.

Suitable organic diluents include, among others, the aromatic hydrocarbons, such as benzene, xylene, and the like; the halogenated aromatic hydrocarbons, such as chlorobenzene and the like; cycloaliphatic hydrocarbons, such as cyclohexane, n-propyl cyclohexane, and the like; alkoxy substituted aromatic hydrocarbons, such as methoxybenzene and the like; aliphatic hydrocarbons, such as n-hexane, n-heptane, and the like; halogenated aliphatic hydrocarbons, such as dichloromethane, and the like; ethers, such as diethyl ether, diethyl ether of ethylene glycol, diethyl ether of 1,3-propylene glycol, dioxane, and the like; aliphatic ketones, such as acetone, methyl ethyl ketone, and the like; also suitable are dimethyl formamide, petroleum ether, and the like.

The reaction between an N-substituted isomaleimide and a piperazine is conducted, generally, under atmospheric pressure, although if desired, the reaction can be conducted under subatmospheric or superatmospheric pressure.

The process of the present invention is conducted by simply admixing an N-substituted isomaleimide and a piperazine at the desired temperature. The reaction between an N-substituted isomaleimide and a piperazine to produce the corresponding bis-maleamide is practically instantaneous in that some of the desired maleamide is formed immediately upon admixing the reactants. It is customary, however, to allow the reaction mixture to stand for at least about one hour in order to insure that the reaction has proceeded to completion.

Recovery of the bis-maleamide from the reaction mixture can be accomplished by any one of a number of convenient methods. For example, in those instances wherein the bis-maleamide is a solid, it can be recovered as a filter cake and, if desired, purified by column chromatography in order to insure removal of unreacted materials. Alternatively, the bis-maleamide can be recrystallized from suitable solvents. If the bis-maleamide is a liquid, it can be recovered as a distillate from the reaction mixture.

The following examples further illustrate the present invention and are not intended to limit the scope thereof in any manner.

*Example 1*

Preparation of a bis-maleamide by reacting piperazine with N-phenyl isomaleimide.

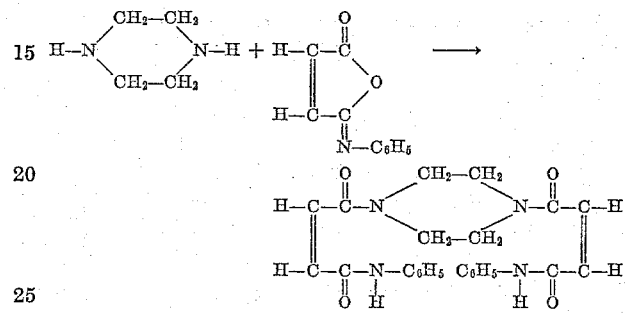

N-phenyl isomaleimide, in an amount of 3.46 grams (0.02 mole) was dissolved in 50 ml. of anhydrous diethyl ether and 0.86 gram (0.01 mole) of piperazine added thereto. The mixture was stirred at room temperature, about 23° C., and after an hour the yellow color of the N-phenyl isomaleimide had disappeared and a white solid had precipitated. Stirring was continued for another two hours and then the product was filtered off and dried. This product was recrystallized from dry ethanol, containing enough dimethyl formamide to dissolve the product, at the boiling point of the mixture of ethanol and dimethyl formamide, and dried to constant weight.

The product, recovered in an amount of 3.14 grams, was found to have a melting point of 219° C.–220° C. The infrared spectrum of this product was consistent with its assigned structure, since it exhibited —NH absorption at $3.10\mu$ and $>C=O$ absorptions at $5.95\mu$ and $6.20\mu$. In addition, it analyzed correctly.

Analysis for $C_{24}H_{24}O_4N_4$.—Found: C, 66.53; H, 5.73; N, 12.85. Calculated: C, 66.64; H, 5.59; N, 12.96.

*Example 2*

Preparation of a bis-maleamide by reacting piperazine with N-n-butyl isomaleimide.

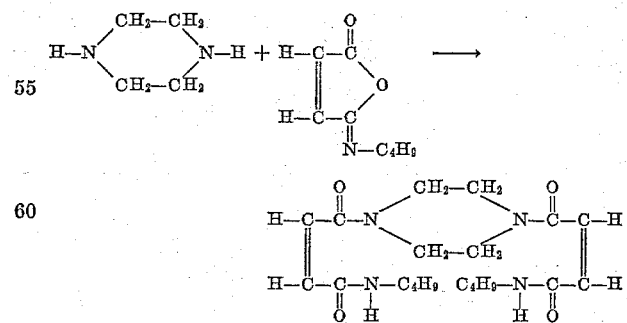

N-n-butyl isomaleimide, in an amount of 3.06 grams (0.02 mole) was dissolved in 60 ml. of anhydrous diethyl ether and 0.86 gram (0.01 mole) of piperazine added thereto. The mixture was stirred at room temperature, about 23° C., for three hours and then the product was filtered off and dried. This product was recrystallized from dry ethanol, and dried to constant weight.

The product, recovered in an amount of 3.52 grams, was found to possess an infrared spectrum which was consistent with its assigned structure and, in addition, it analyzed correctly.

*Analysis* for $C_{20}H_{32}O_4N_4$.—Found: C, 61.19; H, 8.32; N, 14.06. Calculated: C, 61.30; H, 8.25; N, 14.30.

This application is a continuation in part of our copending application Serial No. 31,257 entitled "Bis-Maleamides and a Process for Their Preparation," now U.S. Patent 3,041,376, issued June 26, 1962.

What is claimed is:

1. A bis-maleamide of the formula:

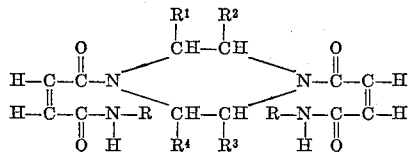

wherein each R is a monovalent hydrocarbon radical containing from 1 to 26 carbon atoms inclusive and $R^1$, $R^2$, $R^3$ and $R^4$ are members selected from the group consisting of hydrogen and monovalent hydrocarbon radicals containing from 1 to 12 carbon atoms inclusive.

2. A bis-maleamide of the formula:

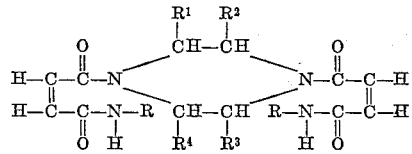

wherein each R is a monovalent hydrocarbon radical containing from 1 to 20 carbon atoms inclusive and $R^1$, $R^2$, $R^3$ and $R^4$ are alkyl radicals containing from 1 to 8 carbon atoms inclusive.

3. A bis-maleamide of the formula:

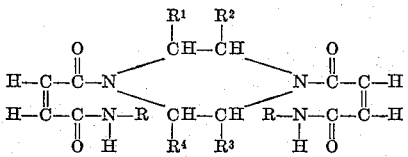

wherein each R is a monovalent hydrocarbon radical containing from 1 to 20 carbon atoms inclusive and $R^1$, $R^2$, $R^3$ and $R^4$ are aryl radicals containing from 1 to 12 carbon atoms inclusive.

4. A bis-maleamide of the formula:

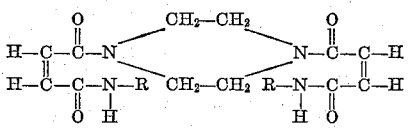

wherein each R is a monovalent hydrocarbon radical containing from 1 to 20 carbon atoms inclusive.

5. A bis-maleamide as defined in claim 4 wherein each R is phenyl.

6. A bis-maleamide as defined in claim 4 wherein each R is n-butyl.

7. A bis-maleamide as defined in claim 1 wherein $R^1$, $R^2$, $R^3$ and $R^4$ are monovalent hydrocarbon radicals containing from 1 to 8 carbon atoms inclusive.

No references cited.